(12) United States Patent
Peña

(10) Patent No.: US 7,168,538 B2
(45) Date of Patent: Jan. 30, 2007

(54) OVERHEAD STORAGE DEVICE FOR ELECTRICAL TOOLS AND METHOD OF CREATING A WORK ZONE

(76) Inventor: Dantia Peña, 3133 1/2 Hood St., Dallas, TX (US) 75219

( * ) Notice: Subject to any disclaimer, the term of this patent is extended or adjusted under 35 U.S.C. 154(b) by 0 days.

(21) Appl. No.: 10/992,414

(22) Filed: Nov. 18, 2004

(65) Prior Publication Data

US 2005/0106935 A1    May 19, 2005

(51) Int. Cl.
*H02G 11/02* (2006.01)
(52) U.S. Cl. ................... 191/12.2 R; 191/12.4
(58) Field of Classification Search ............. 191/12 R, 191/12.2 R, 12.4; 439/501, 502; 174/67
See application file for complete search history.

(56) References Cited

U.S. PATENT DOCUMENTS

| | | | |
|---|---|---|---|
| 4,183,603 A | | 1/1980 | Donarummo |
| 4,350,850 A | * | 9/1982 | Kovacik et al. ........ 191/12.2 R |
| 4,378,473 A | * | 3/1983 | Noorigian .............. 191/12.2 R |
| 4,437,624 A | * | 3/1984 | Rosenberg ................... 242/381 |
| 4,844,373 A | * | 7/1989 | Fike, Sr. ................... 242/588.1 |
| 5,101,082 A | * | 3/1992 | Simmons et al. ....... 191/12.2 R |
| D337,309 S | | 7/1993 | Mally |
| 5,379,903 A | | 1/1995 | Smith |
| 5,547,393 A | | 8/1996 | Jansen |
| 5,690,198 A | * | 11/1997 | Lohr ...................... 191/12.2 R |
| 5,913,487 A | * | 6/1999 | Leatherman ............. 242/378.4 |
| 6,305,388 B1 | | 10/2001 | Zeller |
| 6,331,121 B1 | * | 12/2001 | Raeford, Sr. ................. 439/501 |
| 6,591,952 B1 | | 7/2003 | Randall |

* cited by examiner

Primary Examiner—Mark T. Le
(74) Attorney, Agent, or Firm—Schultz & Associates, P.C.

(57) ABSTRACT

The preferred embodiment of the invention includes a casing that encloses an extension cord system. The casing has slots that allow access to retractable electrical power cords. The cord system comprises a plurality of spring-loaded and ratcheted spools containing electrical power cords. The preferred embodiment of the method includes steps for preventing the entanglement of power cords and maintaining a clutter-free and efficient work environment.

20 Claims, 5 Drawing Sheets

OVERHEAD STORAGE DEVICE FOR ELECTRICAL TOOLS AND METHOD OF CREATING A WORK ZONE

FIELD OF THE INVENTION

The present invention relates generally to the field of hair styling, and more particularly to an apparatus for holding and organizing hair styling tools and defining a work zone around the tools.

DESCRIPTION OF PRIOR ART

Hairstylists customarily use two or more different types and/or sizes of electric tools when styling hair. Examples are hair dryers and clippers. These devices are generally of a power rating sufficient to require a connection to an electrical outlet.

In a work environment, the tools are connected an electrical outlet which is typically found on a wall in front of the hairstyling chair. The cord used to connect the tool is usually about four feet long with an attached plug at one end. When the electric tools are in use, the electrical cords are routinely moved across the chair in a flat radius defined by the cord length of the tool. When several tools are used, the electrical cords typically become tangled due to the repetitive switching between tools and differing electrical cord lengths. Between uses, the tools are usually placed in a location where they are readily accessible or are hung by the loop. The most convenient location is usually a shelf or bench close to or mounted on the wall, also in front of the hairstyling chair.

Prior art devices for storage of electrical cords as shown in U.S. Pat. No. 6,305,338 to Zeller, U.S. Pat. No. 6,591,952 to Randall, U.S. Pat. No. 5,547,393 to Jansen and U.S. Pat. No. 5,379,903 to Smith.

SUMMARY OF THE INVENTION

The preferred embodiment of the invention generally includes a casing that encloses an extension cord system. The casing has slots that allow access to retractable electrical power cords. The cord system comprises a plurality of spring-loaded and ratcheted reels containing electrical power cords. The preferred embodiment of the method includes steps for defining a work zone that prevents the electrical cords from traversing the axis of the chair and the entanglement of power cords and further aids in maintaining a clutter-free and efficient work environment.

The preferred embodiment of the invention comprises a mounting base having several spring loaded and ratcheted cord reels securely attached to it. A power strip is also attached to the mounting base to distribute power to the power cords. A cover is provided over the reels and is attached to the mounting base. Each electrical power cord reel is retractably extendable through a slot in the cover. Lighting is also provided for increasing light to the work environment and for entertainment of patrons.

In use, the mounting base is attached to the ceiling above a work area and slightly behind the chair. The cover faces toward the floor. Hair styling tools are secured to the connectors of the power cords. The cords, when retracted, suspend the tools overhead. When extended, the cords allow convenient use and define a frustroconical work zone around the chair. When use of any one tool is complete, downward motion of the tool activates a ratchet and allows the spring loaded reel to retract the cord placing the tool in its original position.

The invention is not limited in its application to the details of construction and to the arrangements of the components set forth in the following description or illustrated in the drawings. The invention can be embodied in different forms.

DETAILED DESCRIPTION OF PREFERRED EMBODIMENTS

Figure 1:
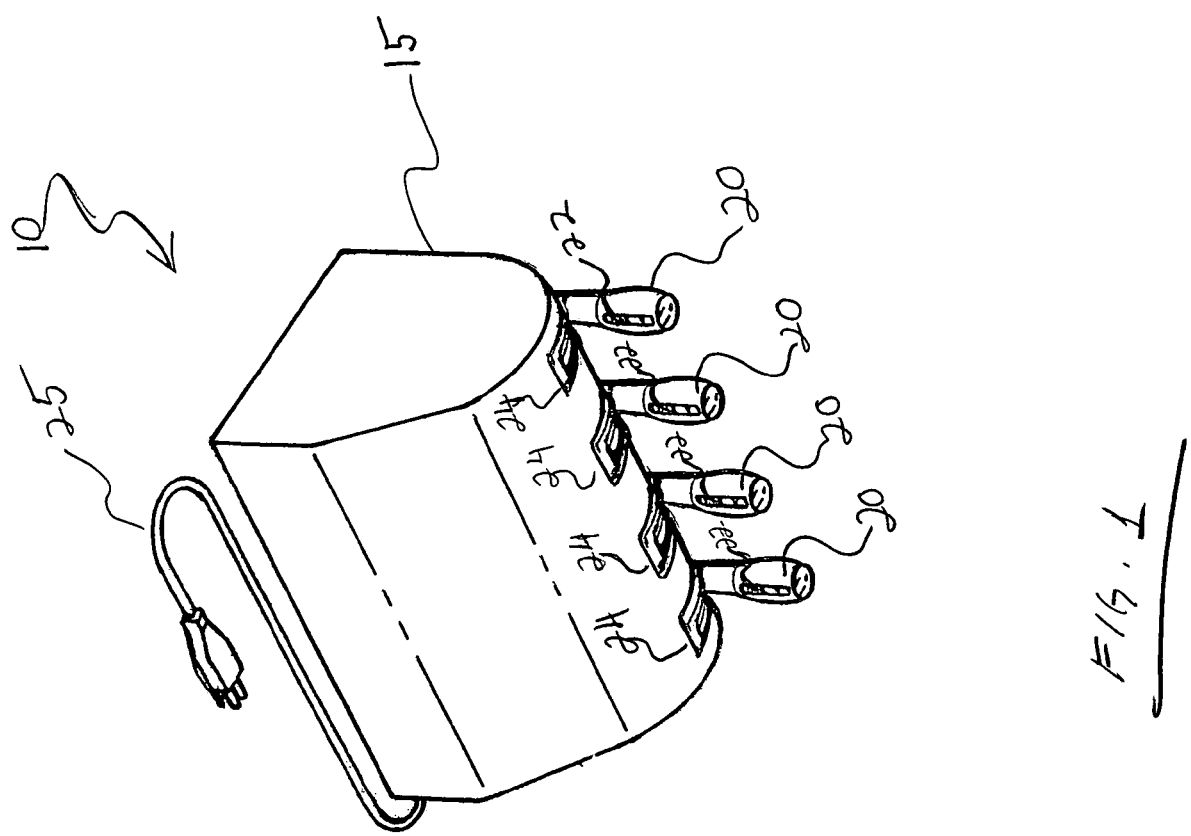
FIG. 1 is a perspective view of the defined embodiment of the overhead storage device.

Overhead storage device 10 is shown in FIG. 1. FIG. 1 shows cover 15 which surrounds the functional elements of the device and protects them from contamination in the work environment. The female or outlet end of a retractable extension cord is shown at 20, each having locking device 22 for securing the plug of an electrical hair styling tool (not shown). Other locking devices, such as those shown in U.S. Pat. Des. 337,309 to Mally and similar attachment devices can be used as well. Power is distributed to the extension cords through main power cord 25. Each extension cord extends through a slot in the cover. Each slot in the preferred embodiment is shown as 24. The preferred embodiment includes four slots 24, but the number is not limited and fewer or greater number of slots and extension cords may be provided in other embodiments as required by the work environment.

Figure 2:
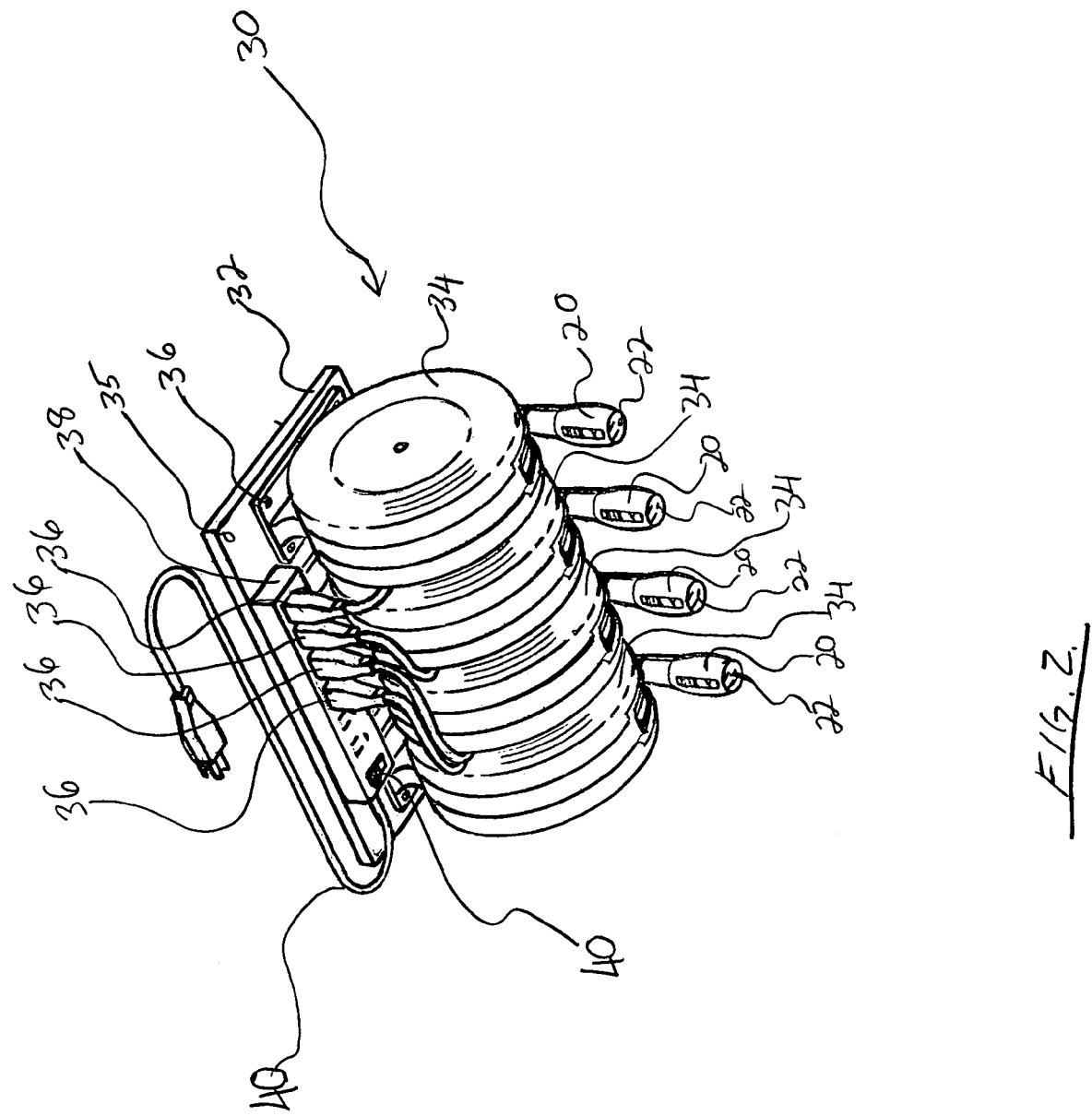
FIG. 2 is a perspective view of a partially assembled configuration of the preferred embodiment.

Moving to FIG. 2, the preferred embodiment of the invention with the cover removed is shown as 30. The preferred includes base 32. Base 32 in the preferred embodiment is constructed of a light aluminum alloy which is rigid and capable of supporting retractable cord reels 34. Base 32 can be made of alternate materials such as Teflon, polyethylene, wood or other metal alloys depending on the strength required and weight considerations of various implementations. Retractable cord reels 34 are attached to base 32 through screw attachments 36. In the preferred embodiment, there are four screw attachments for each retractable cord reel. Of course, other fasteners may be used to accomplish a rigid attachment between base 32 and retractable cord reels 34. In an alternate embodiment, base 32 can be retracted by a frame (not shown) which offers rigid support to the retractable cord reels. Retractable cord reels 34 in the preferred embodiment are spring loaded and ratcheted so that when a downward force is applied to extension cord 20, a length of cord is allowed to extend from retractable cord reels 34. When the force on extension cord 20 is released, the ratchet function of retractable cord reels 34 engages to prevent retraction of extension cord 20. When a downward force is again applied to extension cord 20, the ratchet function of retractable cord reels 34 allows the spring within retractable cord reels 34 (not shown) to retract extension cord 20.

Each cord reel 34 is supplied with a plug 36 for supplying electrical power to outlet 22. Each plug 36 is inserted into plug bar 38 for distribution of power. Plug bar 38 includes a fuse 40. In the preferred embodiment, the fuse is 30 amps, but can be adjusted depending on the power requirements of the tools employed. Plug bar 38 also includes a cord 40 which is sized for the appropriate power load and adapted to connect through a convenient source of power.

In the preferred embodiment, plug bar 38 is known in the art and available from a number of sources. In the preferred embodiment, retractable cord reels 34 are 30-foot, 20 amp retractable reels manufactured by Woods Industries, Inc. of Carmel, Ind.

Base 32 is also provided with four mounting holes 35 for mounting of the overhead storage device to an overhead surface.

Figure 3:
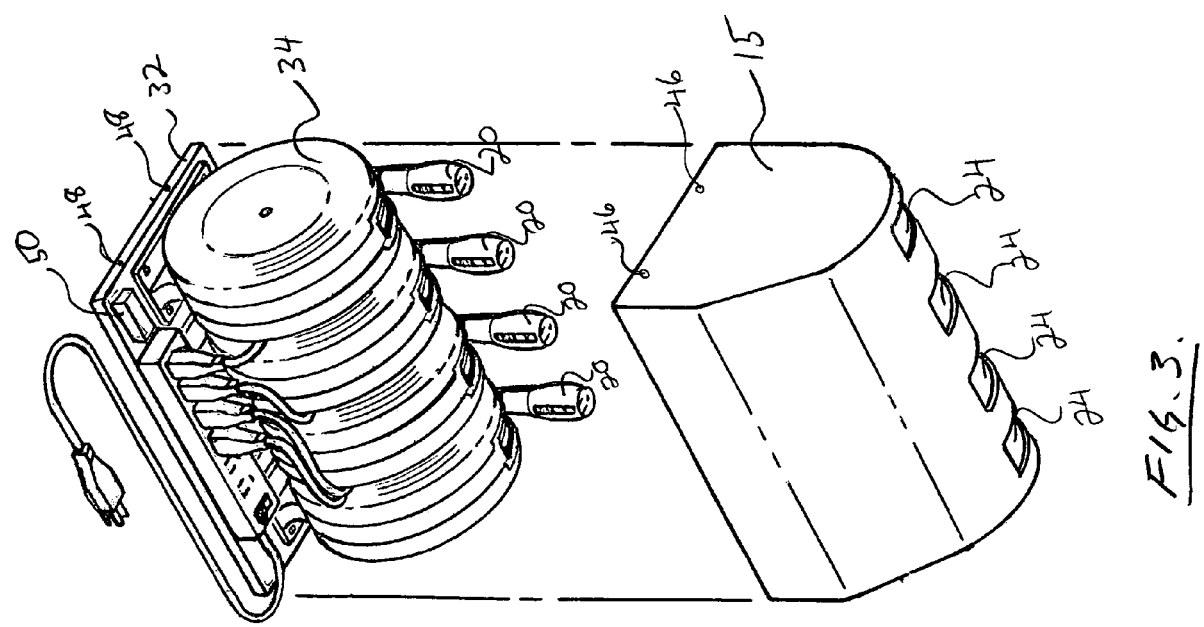
FIG. 3 is a perspective view of a partially assembled configuration of a preferred embodiment including a cover.

FIG. 3 shows an exploded view of the overhead storage device. Cover 15 is sized to fit over retractable cord reels 34 and attached to base 32. Attachment is provided by screws which fit through holes 46 and thread into holes 48 on base 32. In the preferred embodiment, four holes 48 are provided, two on each side of base 32. Of course, other ways to attach cover 15 to base 32 exist and will work as well. Cover 15 is provided with slots 24 which are designed to allow exit of extension cords 20. In the preferred embodiment, cover 15 is a shrink molded polypropylene plastic. In other embodiments, cover 15 can be made of stainless steel, a blow molded plastic, a cast alloy, such as brass, or an injected molded plastic of various colors. In the preferred embodiment, cover 15 is an opaque colored plastic, but other embodiments could be transparent to allow visual inspection of the internal components of the overhead storage device.

In one alternate embodiment, a light producing fixture 50 is provided and sized to fit within cover 15 when it is attached to base 32. Light producing fixture 50 in the alternate embodiment is a helium neon light source which lights the interior of the overhead storage device and also provides light through transparent cover 15 toward the work environment. In other embodiments, light producing fixture 50 can be a strobe light, a colored light, or other light producing fixtures which produce an interesting visual effect. Light producing fixture 50 draws its power from power bar 38 through a cord attachment (not shown).

Figure 4:
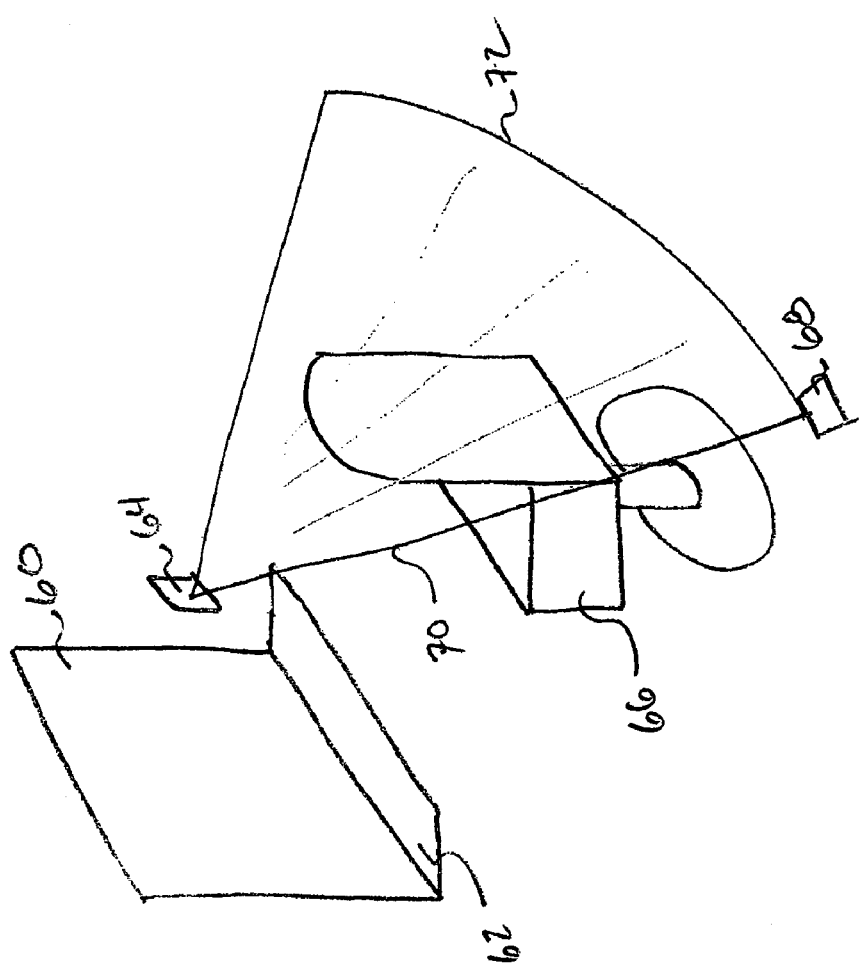
FIG. 4 is a view of a prior art work zone.

FIG. 4 shows the work zone defined by the prior art. In the prior art, a work environment is typically provided which includes mirror 60, shelf 62, power outlet 64 and a chair 66. A hairstyling tool 68 is connected to power outlet 64 by cord 70. During use, cord 70 defines a radius which is swept across chair 66 in arc 72. Arc 72 necessarily intersects chair 66. Therefore, in use, cord 70 must be lifted above chair 66 or passed between mirror 60 and chair 66 to move from one side of chair 66 to the other.

Figure 5:
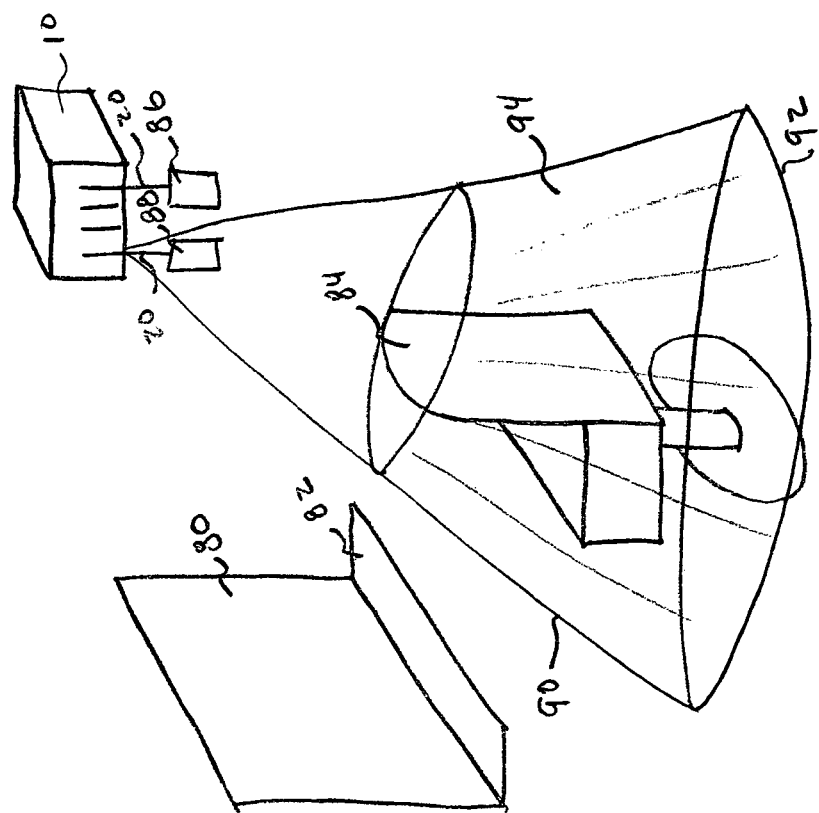
FIG. 5 is a view of the work zone provided by a preferred embodiment of the present invention.

FIG. 5 shows the preferred embodiment of the work zone method of the present invention. In the preferred embodiment, an environment is provided which includes mirror 80, shelf 82, and chair 84 placed in front of mirror 80. Overhead storage device 10 is mounted above and slightly behind chair 84 and in front of mirror 80. Overhead storage device 10 is shown connected to styling tools 86 and 88.

In use, the preferred embodiment of the overhead storage device allows styling tools 86 and 88 to be extended along radius 90. Radius 90 sweeps a circular arc around chair 84 defining a frustro conical work zone 94. When use of tool 88 is complete, cord 20 may be retracted into overhead storage device 10 for storage. Styling tool 86 may then be extended to a length defining a radius which when swept around chair 84, also provides for a frustro conical work zone particular to styling tool 86. Work zone 94 allows styling tools to be moved from one side of the chair and from the front to the back of the chair without intersecting the chair or allowing dangling of cord 20.

The invention claimed is:

1. A storage device for supplying power to a barber tool in a room with a ceiling comprising:

A frame;

A means securing the frame to the ceiling substantially directly above a barber chair;

A retractable cord dispenser mounted to the frame;

A power cord within the retractable cord dispenser having a receptacle for connection to the barber tool; and A fused plug bar means mounted to the frame for supplying power and overload protection to the retractable cord dispenser.

2. The device of claim 1 wherein the receptacle includes a mechanism to lock the connection.

3. The device of claim 1 wherein the barber tool is [a] hair dryer.

4. The device of claim 1 further comprising a cover mounted to the frame.

5. The device of claim 4 wherein the cover is made of a translucent material and wherein a neon light is attached to the frame inside the cover to illuminate the interior of the cover.

6. The device of claim 4 wherein the cover is made of a material which allows the passage of light into the interior of the cover so that the retractable cord dispenser may be seen through the cover.

7. The device of claim 6 further comprising a light source mounted to the frame in a position to illuminate the interior of the cover, the retractable cord dispenser and the fused plug bar means.

8. The device of claim 1 wherein the fused plug bar means further includes a plurality of electrical outlets arrayed side by side.

9. An apparatus for operatively suspending an electrical styling tool above a barber chair in a room with a ceiling and a set of walls comprising:

A mounting means suspending the apparatus from the ceiling substantially directly above the barber chair and away from any one of the set of walls;

A cord ratchet means for retractably dispensing an extension cord;

A connection means for connecting the extension cord to the styling tool; and

A power distribution and fused overload protection means for connecting the connection means to a power source.

10. The apparatus of claim 9 wherein the cord ratchet means includes a ratchet and prawl mechanism.

11. The apparatus of claim 9 further comprising a cover means, covering the cord ratchet means and secured to the mounting means, and wherein the mounting means includes a series of vertical bolts attached to mounting holes for rigidly attaching the mounting means to the ceiling.

12. The apparatus of claim 11 wherein the cover means includes slot means to allow extension of the extension cord out of the cover means.

13. The apparatus of claim 12 further comprising a light based entertainment means protected by the power distribution and fused overload protection means for illuminating the interior of the cover means.

14. The apparatus of claim 11 wherein the material of the cover means is chosen from the group comprising stainless steel, plastic, cast alloy, and brass.

15. The apparatus of claim 11 wherein the cover means is made of transparent plastic and the mounting means includes a light means for illuminating the interior of the cover.

16. The apparatus of claim 9 further comprising a light projecting means, mounted to the mounting means and protected by the power distribution and fused overload protection means for projecting light outside of the cover means.

17. The apparatus of claim 9 wherein the connection means further comprises a locking means for rigidly connecting the extension cord to the electrical styling tool and wherein a wattage rating of the power distribution and fused overload protection means can be varied.

18. In a work environment including a barber chair, a ceiling, a plurality of walls, an overhead cord dispenser including a cord and an electrical appliance connected to the cord, a work zone method comprising the steps of:

Mounting the overhead cord dispenser substantially directly above and slightly behind the barber chair;

Providing a variable fused power distribution port on the overhead cord dispenser;

Defining a radius by a length of cord between the overhead cord dispenser and the electrical appliance;

Circularly sweeping the radius around the chair forming a frustroconical work zone;

Protecting the electrical appliance with a variable fuse of the variable fused power distribution port; and Operating the electrical appliance within the frustroconical work zone in a manner so as not to touch the barber chair.

19. The work zone method of claim 18 wherein the work zone method further includes the steps of illuminating the work zone with a strobe light from the overhead cord dispenser and varying the amperage of the variable fuse.

20. The work zone method of claim 18 further comprising providing a light fixture within the overhead cord dispenser directed within the overhead cord dispenser, powering the light fixture with the variable fused power distribution port and lighting the interior of the overhead cord dispenser with the light fixture.

* * * * *